(12) United States Patent
Amamori

(10) Patent No.: US 6,547,279 B1
(45) Date of Patent: Apr. 15, 2003

(54) AIR BAG APPARATUS

(75) Inventor: Ichiro Amamori, Tokyo (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 09/655,446

(22) Filed: Sep. 5, 2000

(30) Foreign Application Priority Data

Sep. 21, 1999 (JP) .......................................... 11-267568

(51) Int. Cl.$^7$ .............................................. B60R 21/16
(52) U.S. Cl. ................................................ 280/743.1
(58) Field of Search .................... 280/728.1, 728.3, 280/732, 743.1

(56) References Cited

U.S. PATENT DOCUMENTS

| | | | |
|---|---|---|---|
| 4,332,398 A | | 6/1982 | Smith |
| 5,419,579 A | * | 5/1995 | McPherson et al. ..... 280/743.1 |
| 5,425,551 A | * | 6/1995 | Hawthorn ................. 280/743.1 |
| 5,531,477 A | * | 7/1996 | Madrigal et al. ........ 280/743.1 |
| 5,538,281 A | * | 7/1996 | Patercsak ................. 280/743.1 |
| 5,806,879 A | * | 9/1998 | Hamada et al. .......... 280/728.2 |
| 5,957,486 A | * | 9/1999 | Taguchi et al. .......... 280/743.1 |
| 6,176,509 B1 | | 1/2001 | Kawaguchi et al. |
| 6,244,624 B1 | * | 6/2001 | Kumagai .................. 280/743.1 |
| 6,247,727 B1 | * | 6/2001 | Hamada et al. .......... 280/743.2 |

FOREIGN PATENT DOCUMENTS

| | | |
|---|---|---|
| DE | 43 43 026 | 6/1994 |
| DE | 198 30 299 | 1/1999 |
| EP | 0 734 911 | 10/1996 |
| JP | 2810831 | 7/1998 |

* cited by examiner

Primary Examiner—Paul N. Dickson
Assistant Examiner—Faye M. Fleming
(74) Attorney, Agent, or Firm—Kanesaka & Takeuchi

(57) ABSTRACT

An air bag is folded and accommodated in a container to be inflated by an inflator. An end portion of a gas inlet of the air bag is fastened to the container. The air bag has left and right side portions folded in a form of bellows to form an elongated intermediate folding body. Two sides of the intermediate folding body are folded in a form of bellows or a roll and accommodated in the container. The air bag can be inflated very smoothly.

5 Claims, 7 Drawing Sheets

AIR BAG APPARATUS

BACKGROUND OF THE INVENTION AND RELATED ART STATEMENT

The present invention relates to an air bag apparatus, and more particularly, to an air bag apparatus suitable for a passenger seat air bag apparatus installed in an instrument panel in front of a passenger seat in a vehicle, such automobile.

A passenger seat air bag apparatus includes a container arranged in an instrument panel in front of a passenger seat, a gas generator, an air bag accommodated in the container and having an opening through which gas ejected from the gas generator is received, and a lid for covering the container. An end portion around the opening is connected to the container. In collision of the vehicle, the gas generator is activated to start inflation of the air bag. When the air bag starts to inflate, the lid is pushed by the air bag and opened, and the air bag inflates into the passenger compartment.

The air bag has a gas inlet through which gas is received from the gas generator. The end portion of the gas inlet is connected to the container.

To fold the air bag, as described in Japanese Unexamined Patent Publication (KOKAI) No. 4-100754, a left side and a right side of the air bag are folded at a middle portion to form an intermediate folded body. The intermediate folded body is then folded in a form of bellows to form a block-like body. The block-like body is accommodated in the container.

A procedure for folding an air bag described in Japanese Unexamined Patent Publication No. 4-100754 will now be described with reference to FIGS. 6 to 12.

FIG. 6 is a perspective view showing an air bag 1, which is spread in a plane, and a sub-container 2. The air bag 1 is an inflatable bag having short sides 1b, which are straight, and left and right long sides 1a, which are curved in an arcuate manner. At the side opposite to the side that faces the passenger, the air bag 1 has at the middle thereof a gas inlet 3 through which gas is received from an inflator, and gas outlets (vent holes) 4 to absorb the impact when a human body hits the deployed (fully inflated) air bag. Reference numerals 5 denote rivet holes. Apertures 6 are formed at the bottom of the sub-container 2 to allow the gas from the inflator to pass therethrough.

As shown in FIG. 7, the air bag 1 is spread out with the sub-container 2 connected thereto. As shown in FIG. 8 and FIG. 9 (cross-sectional view taken along line 9—9 in FIG. 8), the portions of the long sides 1a are folded inwardly to form an intermediate folding body, so that the width of the air bag 1 is slightly narrower than the width of the sub-container 2.

Then, as shown in FIG. 10 (side view of FIG. 8 in the direction of line 10—10), the air bag 1 is folded for a number of times in a form of bellows in a direction perpendicular to the straight long sides 1a' of the intermediate folding body. As shown in FIG. 11, the folded portions are overlapped and then accommodated in the sub-container 2 (FIG. 12).

In Japanese Unexamined Patent Publication No. 4-100754, the air bag is folded and accommodated in the sub-container, and the sub-container 2 is accommodated in a main container (not shown). However, the sub-container may be eliminated, and the folded air bag may be directly accommodated in a container (Japanese Unexamined Patent Publication (KOKAI) No. 10-152008).

FIGS. 13 and 14(a) are plan views showing how an air bag is folded in Japanese Unexamined Patent Publication No. 10-152008. An air bag 1', which has a gas inlet 3', includes a left side portion and a right side portion, which are folded twice as shown in FIGS. 14(a) and 14(b) to form an elongated intermediate folding body. Then, an upper half of FIG. 14(a) is folded in a form of a roll, and the lower half is folded in a form of bellows and accommodated in a container.

When the air bags 1, 1' are about to be inflated or deployed by gas from the inflator, the air bags 1, 1' start to inflate by projecting in a direction perpendicular to the lid. The lid is flush with the surface of the instrument panel. Thus, the air bags 1, 1' start to inflate in a direction perpendicular to the surface of the instrument panel.

When the air bag starts to inflate in the direction perpendicular to the surface of the instrument panel, the left side portion and the right side portion are folded and overlapped with each other in a complicated manner in the conventional passenger seat air bag apparatus. The air bag, in which the left side portion and right side portion are folded and piled, is inflated so as to push out a forefront portion of the air bag. Thus, in order to sufficiently inflate the air bag, the air bag must be supplied with high pressure gas to apply a pushing force to the forefront portion of the air bag, and the gas generator having a large output must be used.

Accordingly, an object of the present invention is to provide an air bag apparatus that sufficiently and quickly inflates an air bag without increasing the output of the gas generator.

SUMMARY OF THE INVENTION

An air bag according to the present invention includes a container having a front opening, a gas generator inflating an air bag, and an air bag accommodated in the container in a folded state and having a gas inlet through which gas is received. The gas inlet has an end portion connected to the container. A lid covers the opening of the container. The air bag has a left side portion and a right side portion folded at a middle portion to form an intermediate folding body having a narrow lateral width, the intermediate folding body being folded along a laterally extending crease line. In the air bag apparatus, the left side portion and the right side portion of the air bag are folded in a form of bellows.

In collision of a vehicle, in which the air bag apparatus is installed, the gas generator is activated, so that the air bag pushes and opens the lid from the inner side, and starts to inflate toward the passenger compartment.

In this case, during inflation, a forefront portion of the air bag is forced out above the instrument panel thereby pulling the left side portion and the right side portion. Since the left side portion and the right side portion are folded in bellows, the left side portion and the right side portion are spread out smoothly when they are pulled by the forefront portion of the air bag.

In the present invention, it is preferred that a clearance of 50 mm or less be provided between the left side portion and the right side portion of the air bag when the left side portion and the right side portion are folded at the middle portion in a form of bellows.

In this specification, the left and right of the air bag refer to the left and right of a passenger sitting in a seat and viewing an air bag apparatus, which is installed in a vehicle.

DETAILED DESCRIPTION OF PREFERRED EMBODIMENTS

Figure 1A:
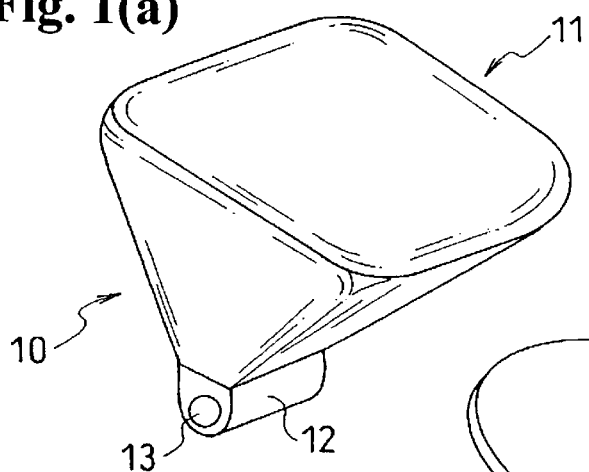
FIG. 1(a) is a perspective view showing one embodiment of a passenger seat air bag apparatus of the invention.

Embodiments according to the present invention will now be discussed with reference to the drawings. FIG. 1(a) is a perspective view showing a passenger seat air bag apparatus of the embodiment, and FIGS. 2(a), 3, 4 and 5 are perspective views showing the air bag when it is folded.

The passenger seat air bag apparatus 10 includes an air bag 11, a container 12 accommodating the air bag 11, an inflator 13 attached to the container to generate gas for inflating the air bag 11, and a lid (12' in FIG. 5) covering an upper opening of the container. The air bag 11 has a gas inlet, an end of which is connected to the container 12 by fastening members 15.

Figure 1B:
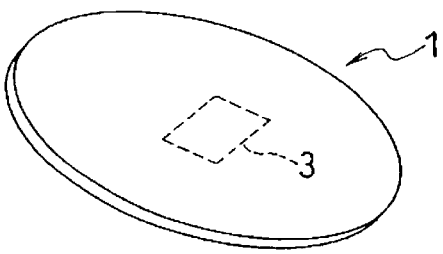
FIG. 1(b) is a perspective view of an air bag spread in a plane form.

FIG. 1(a) shows a three-dimensional (generally pyramidal) air bag 11, but a planar air bag 1 as shown in FIG. 1(b), similar to those shown in FIGS. 6 to 13 may also be used. The air bag 11 will now be discussed, though the same applies to the air bag 1.

Figure 2A:
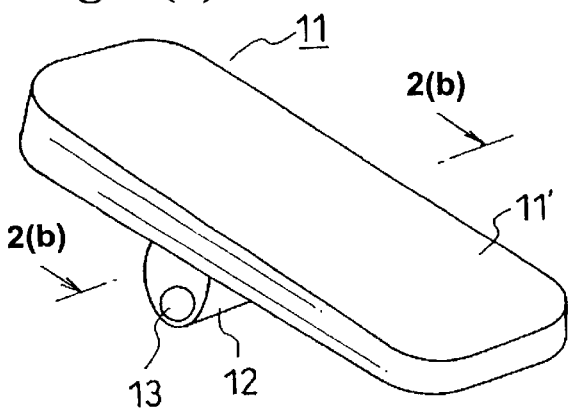
FIG. 2(a) is a perspective view showing a method of folding an air bag of the passenger seat air bag apparatus according to the embodiment.
Figure 2B:
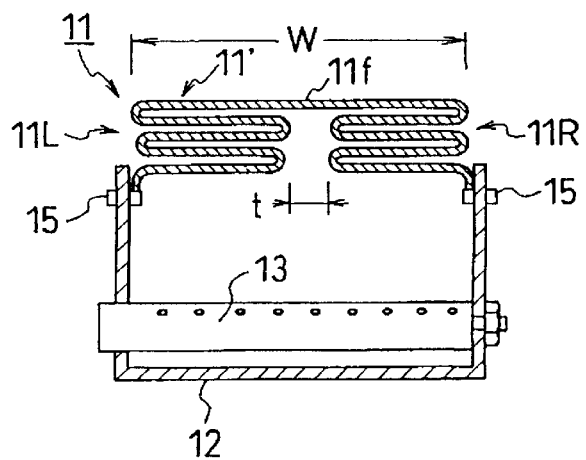
FIG. 2(b) is a cross-sectional view taken along line 2(b)—2(b) in FIG. 2(a)

As shown in FIGS. 2(a) and 2(b), long sides at the left and right side portions of the air bag are folded inwardly under a middle portion of the air bag 11 to form an intermediate folding body 11', which is long in the longitudinal direction of the vehicle. Left and right side portions 11L, 11R are folded in a form of bellows under the middle portion. The width W of the intermediate folding body 11' is substantially the same as that of the container 12.

Figure 3:
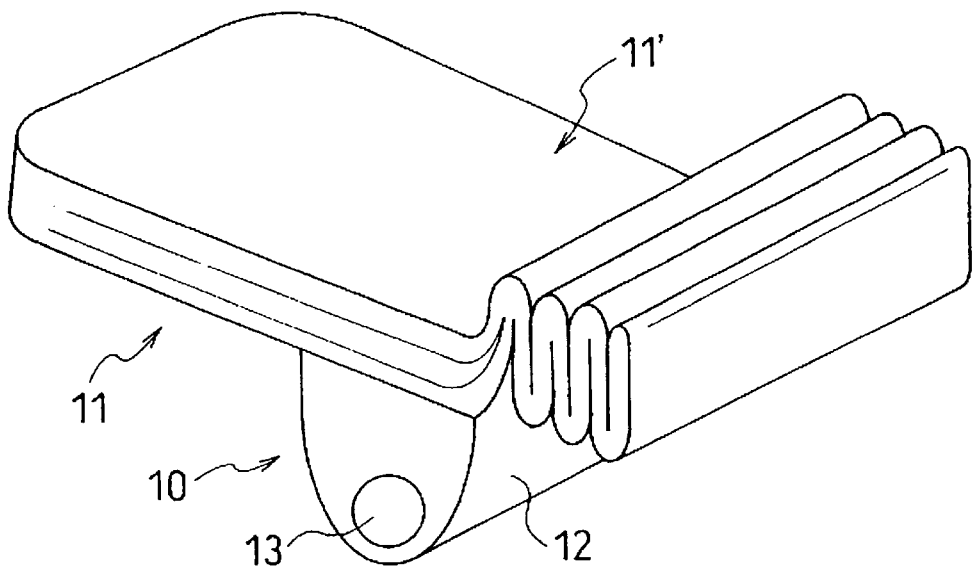
FIG. 3 is a perspective view showing a method of folding an air bag of the passenger seat air bag apparatus according to the embodiment.
Figure 4:
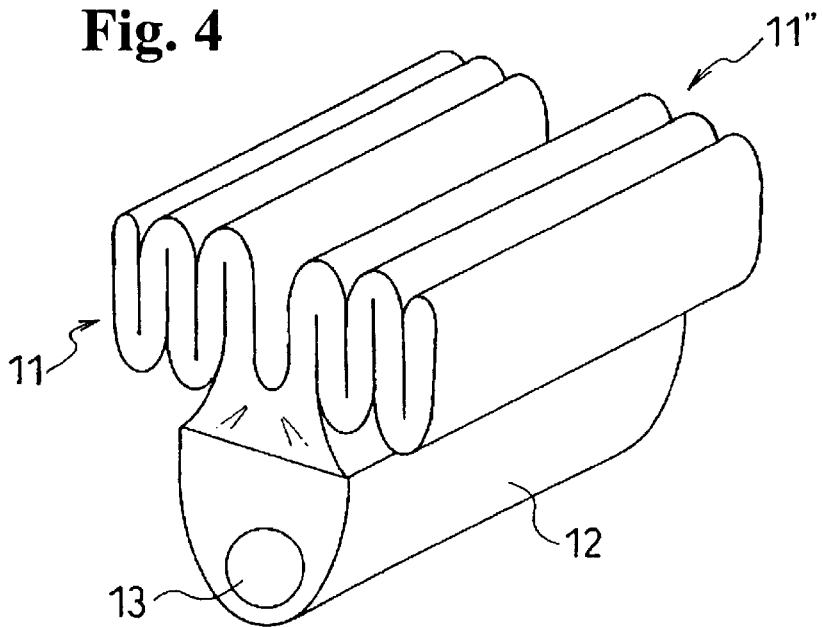
FIG. 4 is a perspective view showing a method of folding an air bag of the passenger seat air bag apparatus according to the embodiment.
Figure 5:
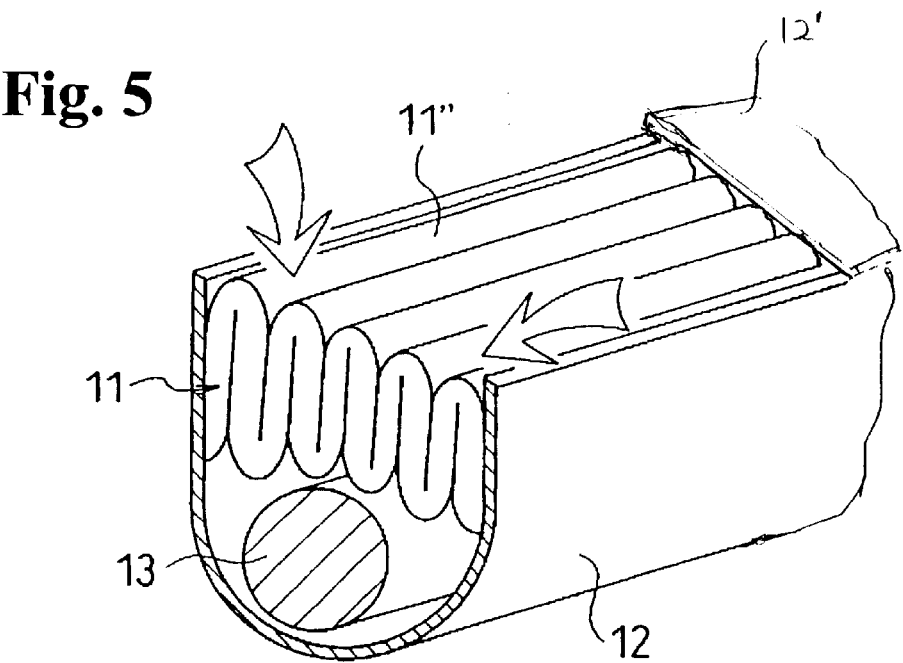
FIG. 5 is a perspective view showing a method of folding an air bag of the passenger seat air bag apparatus according to the embodiment.
Figure 6:
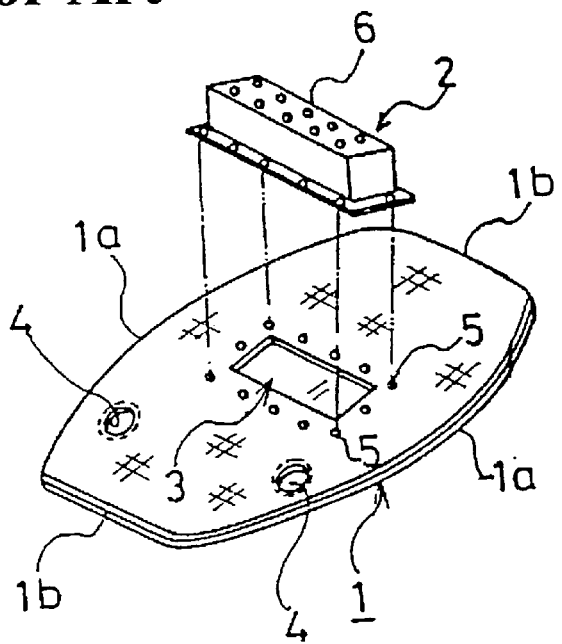
FIG. 6 is a perspective view showing a prior art example.
Figure 7:
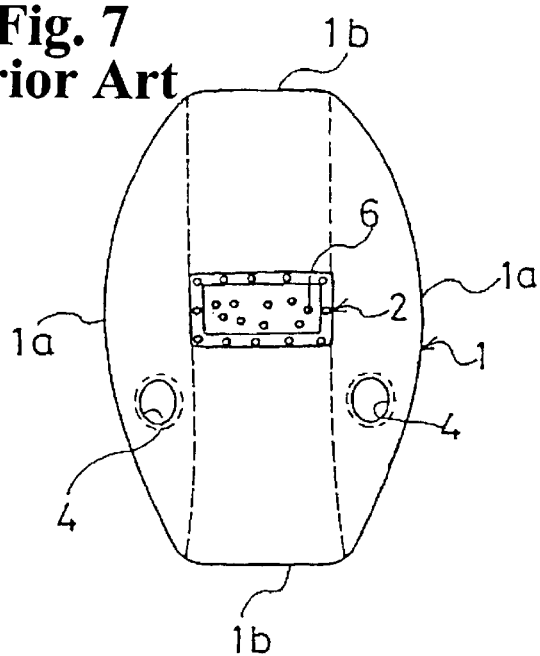
FIG. 7 is a plan view showing the prior art example.
Figure 8:
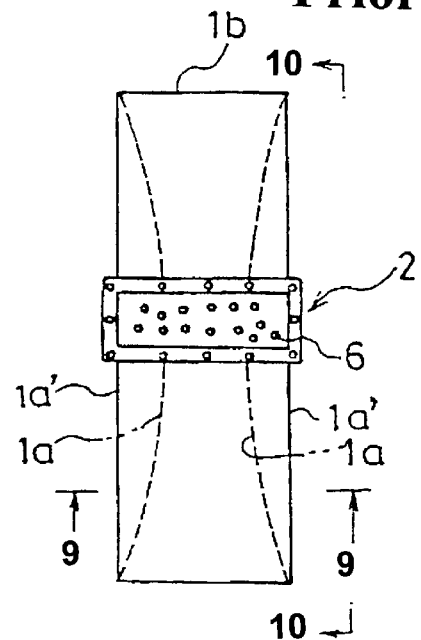
FIG. 8 is a diagram illustrating a prior art method for folding the prior art air bag.
Figure 9:
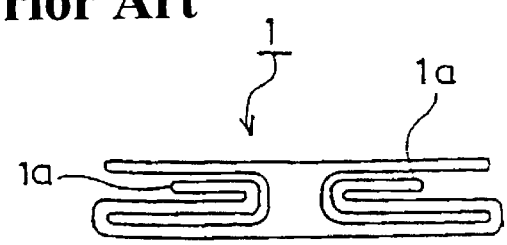
FIG. 9 is a cross-sectional view taken along line 9—9 in FIG. 8.
Figure 10:
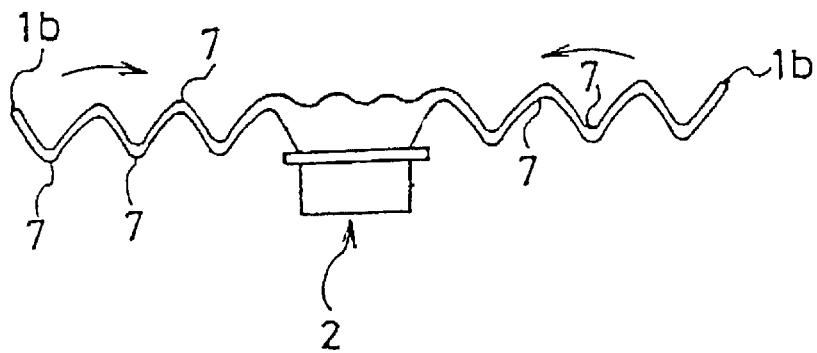
FIG. 10 is a diagram illustrating the method for folding the prior art air bag.
Figure 11:
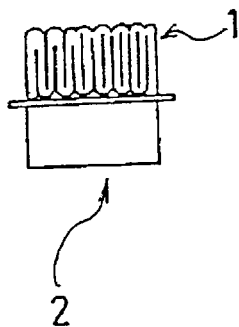
FIG. 11 is a diagram illustrating the prior art air bag folding method and accommodating method to a container.
Figure 12:
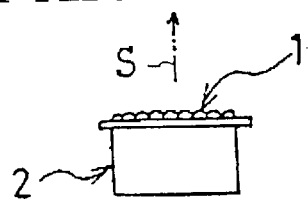
FIG. 12 is a diagram illustrating the prior art air bag folding method and accommodating method to the container.
Figure 13:
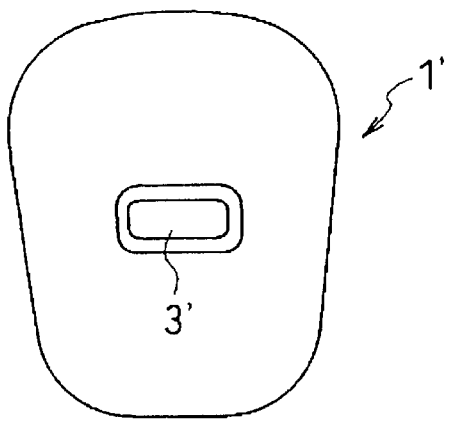
FIG. 13 is a diagram illustrating a further prior art method for folding an air bag.
Figure 14A:
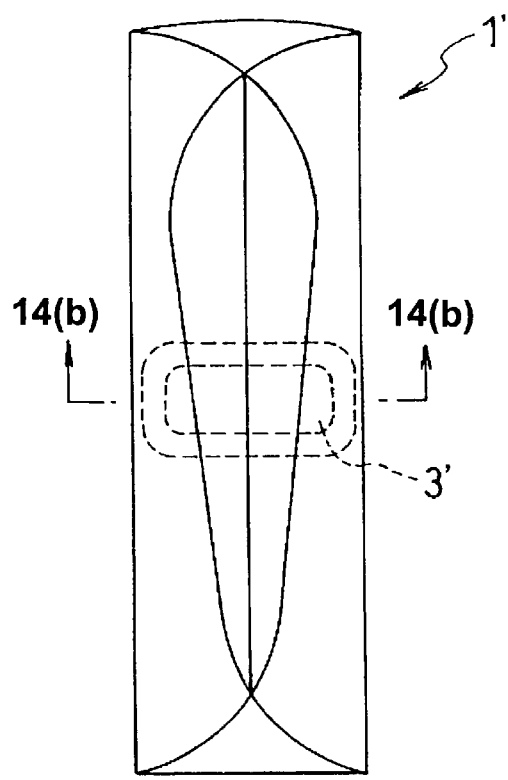
FIG. 14(a) is a diagram illustrating a method for folding the prior art example of FIG. 13.
Figure 14B:
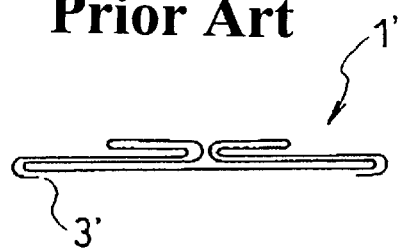
FIG. 14(b) is a cross-sectional view taken along line 14(b)—14(b) in FIG. 14(a)

The intermediate folding body 11' is then folded along crease lines in the lateral direction as shown in FIGS. 3 and 4. During the folding, half of the intermediate body in the longitudinal direction is folded in a form of bellows as shown in FIG. 3, and the remaining half is folded in a form of bellows as shown in FIG. 4. The folding body 11" is then accommodated in the container 12 as shown in FIG. 5.

As shown in FIG. 2(b), it is preferable that a clearance t between the left and right side portions 11L, 11R be 50 mm or less. It is preferable that the left and right side portions 11L, 11R do not overlap each other. In other words, it is preferable that the clearance t be 0 mm or more. If the two side portions 11L, 11R are overlapped, it is preferable that the overlapped length be 15 mm or less.

The air bag 11 is folded after the end of the gas inlet is connected to the container 12 by the fastening members 15.

In the above passenger seat air bag apparatus 10, collision of the automobile causes the inflator 13 to generate gas. The gas of the inflator 13 flows through the clearance t between the left and right side portions 11L, 11R to push and inflate a forefront portion 11f of the air bag. This pushes and opens the lid and starts inflating the air bag 11 in the passenger compartment.

In this case, the forefront portion 11f of the air bag 11 pulls and unfolds the following left and right side portions 11L, 11R while inflating in the passenger compartment. Since the left and right side portions 11L, 11R are folded in bellows, they are spread out smoothly and the air bag inflates immediately. Accordingly, even if the employed inflator 13 has a small capacity and its generated gas amount and gas generation pressure are low, the air bag 11 is inflated sufficiently and quickly.

Figure 15:
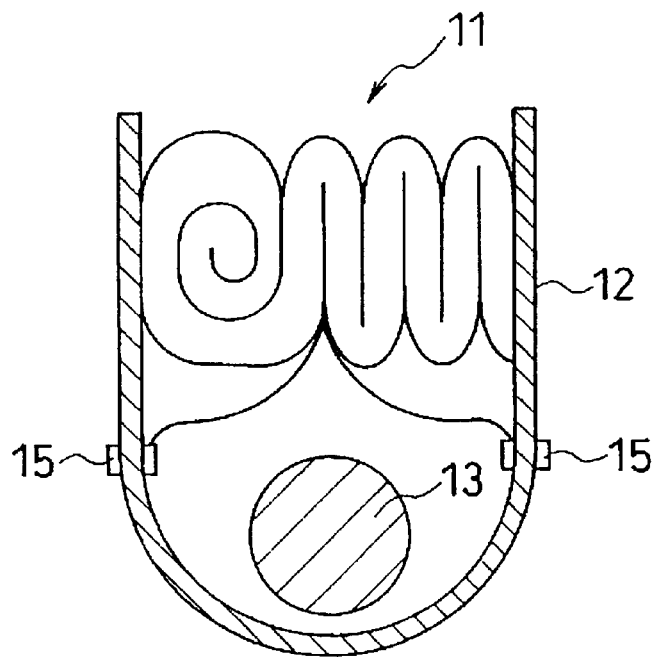
FIG. 15 is a cross-sectional view of a passenger seat air bag apparatus according to a further embodiment of the invention.
Figure 16:
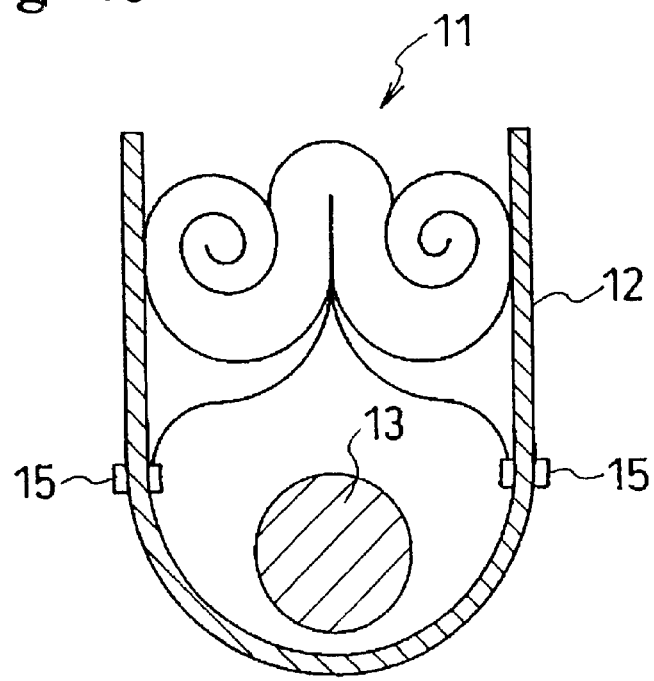
FIG. 16 is a cross-sectional view of a passenger seat air bag apparatus according to another embodiment.

FIGS. 15 and 16 are cross-sectional views showing further embodiments of the folding method according to the present invention. FIG. 15 shows an intermediate folding body having a half folded in bellows and a half folded in a roll. In FIG. 16, both halves of the intermediate folding body are rolled. The air bag apparatuses of FIGS. 15 and 16 have substantially the same advantage as the air bag apparatus of FIGS. 1(a) to 5.

As described above, in the present invention, the air bag can quickly inflate in the passenger compartment, and the gas generator can be made to have a small volume.

While the invention has been explained with reference to the specific embodiments of the invention, the explanation is illustrative and the invention is limited only by the appended claims.

What is claimed is:

1. A passenger seat air bag apparatus comprising:
   a container having a front opening,
   a gas generator,
   an air bag accommodated in the container in a folded state and including a gas inlet through which gas from the gas generator is received, an end portion formed around the gas inlet connected to the container, a middle portion extending perpendicular to a longitudinal direction of the container and having a width substantially same as a length of the longitudinal direction of the container, and left and right side portions relative to the middle portion when the air bag is placed in a flat form, said left and right side portions being respectively folded inwardly in a form of first bellows under the middle portion to have a clearance therebetween and to form an intermediate folding body so that the left and right side portions do not overlap with each other under the middle portion to substantially directly provide the gas from the gas generator to the middle portion when the gas generator is actuated, said intermediate folding body having two halves separated by the gas inlet, at least one of said halves being folded in a form of second bellows so that flat portions of the second bellows extend vertically relative to the gas generator and disposed in the container above the gas generator, and a lid covering the opening of the container.

2. A passenger seat air bag apparatus according to claim 1, wherein said clearance between the left and right side portions is 50 mm or less.

3. A passenger seat air bag apparatus according to claim 2, wherein said container has a middle portion spaced away from the front opening, said end portion of the air bag being fixed to the middle portion.

4. A passenger seat air bag apparatus according to claim 1, wherein said two halves are folded in the form of the second bellows so that flat portions of the two halves extend vertically and face each other in the container.

5. A passenger seat air bag apparatus according to claim 1, wherein the other of said two halves is rolled so that a roll-in-portion faces upwardly.

* * * * *